US009726760B2

(12) United States Patent
Lai

(10) Patent No.: US 9,726,760 B2
(45) Date of Patent: Aug. 8, 2017

(54) DUAL-DIRECTIONAL LASER RANGEFINDER

(71) Applicant: TRISON GLOBAL COMPANY LIMITED, Taichung (TW)

(72) Inventor: Yin-Wu Lai, Taichung (TW)

(73) Assignee: TRISON GLOBAL COMPANY LIMITED, Taichung (TW)

( * ) Notice: Subject to any disclaimer, the term of this patent is extended or adjusted under 35 U.S.C. 154(b) by 423 days.

(21) Appl. No.: 14/522,908

(22) Filed: Oct. 24, 2014

(65) Prior Publication Data

US 2016/0116277 A1    Apr. 28, 2016

(51) Int. Cl.
*G01C 3/08*      (2006.01)
*G01S 17/08*     (2006.01)
*G01S 17/87*     (2006.01)
*G01S 7/481*     (2006.01)
*G01S 17/36*     (2006.01)

(52) U.S. Cl.
CPC ............ *G01S 17/08* (2013.01); *G01S 7/4813* (2013.01); *G01S 17/87* (2013.01); *G01S 17/36* (2013.01)

(58) Field of Classification Search
CPC .......... G01S 17/08; G01S 17/87; G01S 17/36; G01S 7/4813
USPC ....................................... 356/4.01
See application file for complete search history.

(56) References Cited

U.S. PATENT DOCUMENTS

| 9,127,935 | B2* | 9/2015 | Olexa | G01B 11/14 |
| 2007/0071430 | A1* | 3/2007 | Iwanaga | G01C 3/10 |
| | | | | 396/114 |
| 2014/0071425 | A1* | 3/2014 | Dunne | G01C 15/002 |
| | | | | 356/4.01 |
| 2015/0338207 | A1* | 11/2015 | Olexa | G01B 11/14 |
| | | | | 33/286 |

FOREIGN PATENT DOCUMENTS

| CN | 2667505 Y | 12/2004 |
| CN | 102283653 A | 12/2011 |
| CN | 203190964 U | 9/2013 |
| KR | 20140102452 | 8/2014 |
| TW | M351345 | 2/2009 |
| TW | 201403019 | 1/2014 |

* cited by examiner

*Primary Examiner* — Mark Hellner
(74) *Attorney, Agent, or Firm* — patenttm.us

(57) ABSTRACT

A dual-directional laser rangefinder has a housing with two laser modules and one control module mounted therein. The laser modules emit laser beams toward both sides of the housing and receive the reflected laser beams. The control module computes respectively travel times or the phase differences for the two laser beams from the laser modules, and then computes two distances from the two ends of the housing to the two objects of interest. After adding the length of the housing, the invention obtains an actual total distance between the two objects of interest.

12 Claims, 4 Drawing Sheets

DUAL-DIRECTIONAL LASER RANGEFINDER

BACKGROUND OF THE INVENTION

1. Field of the Invention

The invention relates to a laser rangefinder and, in particular, to a laser rangefinder that can measure distances in dual directions.

2. Description of Related Art

The existing method of measuring the distance between two objects that are far apart (e.g., the distance between two opposite walls or from the floor to the ceiling in a room) usually involves the user of a tape measure. However, the tape measure has to touch against the two end surfaces of the two objects whose distance in between is of interest. Moreover, the tape measure has the problem of flexibility and measuring errors. When the ceiling is too high, the tape measure may have the problem of unable to reach the ceiling. Therefore, one encounters the problems of insufficient length, inconvenience in usage, and/or large errors when using the tape measure to measure the distance between two objects.

When using a laser rangefinder to measure the distance between two objects, one normal put the laser rangefinder against one of the end surfaces (e.g., the floor). The laser rangefinder emits a laser beam toward the other end surface (e.g., the ceiling) and receives the reflected laser beam from the end surface (i.e., the ceiling). By measuring the difference between the emission time and reception time of the laser beam, the distance between the two objects can be calculated. However, the current laser rangefinder requires that the laser beam be perpendicular to the end surface. This easily results in measuring errors. Besides, one has to put the laser rangefinder against one of the end surfaces in order to measure the distance to the other end surface. This is quite inconvenient in practice.

SUMMARY OF THE INVENTION

In view of the foregoing, the existing laser rangefinder is inconvenient in practice uses because one has to put the laser rangefinder against one of the end surfaces in order to measure the distance to the other end surface. It is therefore an objective of the invention to provide a dual-directional laser rangefinder. The disclosed laser rangefinder has a plurality of laser modules to emit/receive laser beams toward two opposite directions. There is no need to put the laser rangefinder against any of the end surfaces. This solves the problems in the prior art.

To achieve the above-mentioned objective, the disclosed dual-directional laser rangefinder includes:

a housing;

a control module inside the housing;

two laser modules disposed on two ends of the housing, each of the laser modules having a laser emitter and a laser receiver and being electrically connected to the control module;

a display module provided on the housing and electrically connected with the control module; and a key module provided on the housing and having a plurality of keys that are electrically connected with the control module.

The two laser modules emit laser beams toward opposite directions of the housing and receive reflected laser beams from objects whose distance in between is to be determined. The control module computes the difference in the travel times of or the difference in the phases of the laser beams from the two laser modules, thereby calculating the distances from the two laser modules o the two corresponding objects. Such information is then used to obtain the actual distance between the two objects.

The above-mentioned dual-directional laser rangefinder utilizes two laser modules to emit two laser beams toward opposite directions of the housing and to receive the reflected laser beams from the objects whose distance in between is to be determined. The control module computes the difference in the travel times of or the difference in the phases of the laser beams from the two laser modules, thereby calculating the distances from the two laser modules o the two corresponding objects. Including the length of the housing, the invention obtains the actual total distance between the two objects. It does not require the user to put the laser rangefinder against any of the end surfaces. Therefore, the disclosed laser rangefinder is more convenient in use.

DETAILED DESCRIPTION OF THE PREFERRED EMBODIMENT

Figure 1:
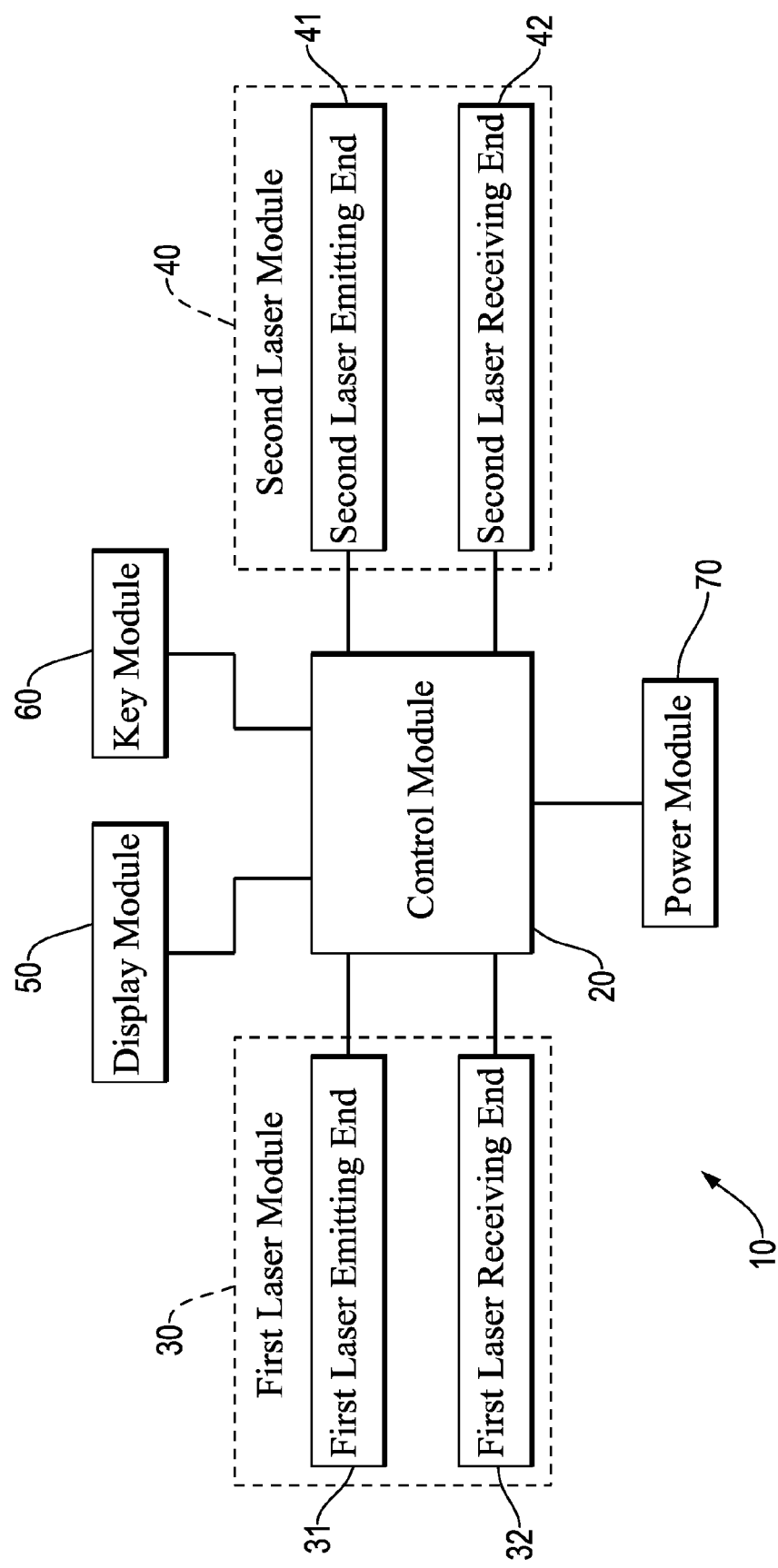
FIG. 1 is a circuit block diagram for a preferred embodiment of a dual-directional laser rangefinder of the invention.

A preferred embodiment of the invention is illustrated in FIG. 1. A dual-directional laser rangefinder comprises a housing 10 that accommodates a control module 20, a first laser module 30, a second laser module 40, a display module 50, a key module 60, and a power module 70. Please refer to FIGS. 3 and 4. The housing 10 is a rectangular hollow box. The two end surfaces along the longitudinal direction are disposed with the first laser module 30 and the second laser module 40. One end (the top end) of the housing 10 in the vertical direction is provided with the display module 50 and the key module 60. The end opposite to the top end (i.e., the bottom end) of the housing 10 is provided with the power module 70 (not shown). The control module 20 is a circuit board installed inside the housing 10.

The first laser module 30 includes a first laser emitting end 31 and a first laser receiving end 32. The first laser emitting end 31 and the first laser receiving end 32 of the first laser module 30 electrically connect to the control module 20. The second laser module 40 includes a second laser emitting end 41 and a second laser receiving end 42. The second laser emitting end 41 and the second laser receiving end 42 of the second laser module 40 electrically connect to the control module 20.

Figure 3:
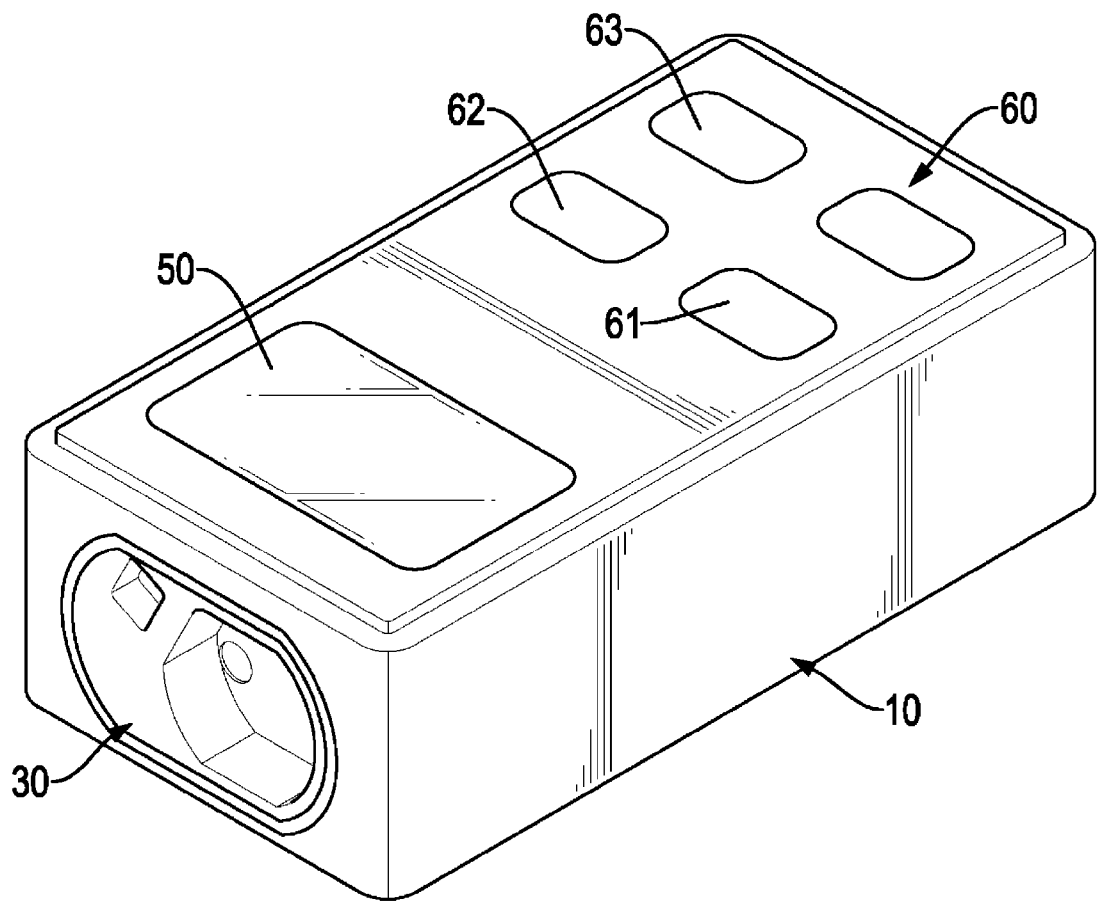
FIG. 3 is a perspective view of the front end of the dual-directional laser rangefinder in use.
Figure 4:
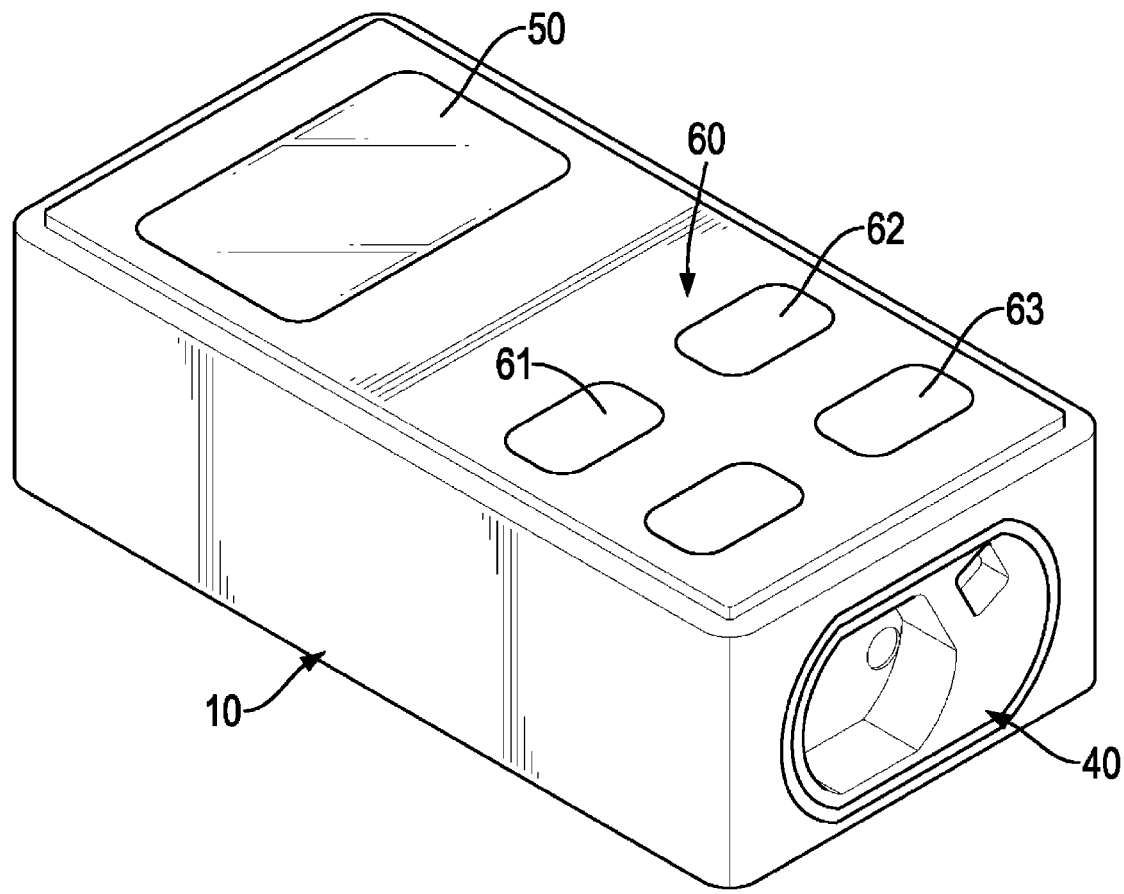
FIG. 4 is a perspective view of the rear end of the dual-directional laser rangefinder in use.

As shown in FIGS. 3 and 4, the first laser module 30 is installed on one end (front end) in the longitudinal direction of the housing 10, and the second laser module 40 on the other end (rear end) thereof. They emit/receive laser beams toward/from opposite directions of the housing 10. The optical axes of the two laser beams differ by 180 degrees. Since the structure and usage of the two laser modules are well-known in the prior art, they are not further described herein. In the preferred embodiment, each of the two laser modules has a laser emitting end and a laser receiving end.

However, the laser emitting end and the laser receiving end of each of the laser modules can be integrated together, instead of being separate. The invention does not impose any restriction on such possibilities.

The display module 50 electrically connects to the control module 20 to receive signals from the control module 20, thereby displaying measured individual distances, total distance, or settings. In the preferred embodiment, the display module 50 is a liquid crustal display (LCD).

The key module 60 has several keys, each of which electrically connects to the control module 20. In the preferred embodiment, the keys include a power key 61 (POWER or ON/OFF), a measure key 62, and a unit selection key 63 (e.g., in the units of meters or inches).

The power module 70 electrically connects to the control module 20 for providing the power needed by all the modules. In the preferred embodiment, the power module 70 is a direct current (DC) power source (e.g., a battery).

The control module 20 includes a micro controller (not shown), a memory unit (not shown), a driver circuit (not shown) for the display module 50, and a power managing unit (not shown). Since the structures and usage of such elements of the control module 20 are well-known to people skilled in the art, they are not further described herein.

When a user wants to measure the distance between two objects, he or she turns on the power by pressing the power key 61 of the key module 60. Afterwards, the user orients the housing 10 so that the two ends along the longitudinal direction, namely, the first laser module 30 and the second laser module 40, face the two end surfaces whose distance in between is to be determined. The user then presses the measure key 62 for the control module 20 to calculate respectively the travel times or phase differences of the beams from the first laser module 30 and the second laser module 40, thereby calculating respectively the distance from first laser module 30 to the corresponding end surface and that from the second laser module 40 to the corresponding end surface. After including the length of the housing 10, the invention obtains the actual total distance between the two end surfaces. The user can use the unit selection key 63 to change the unit of the displayed distance, such as from meter to inches.

Besides, the control module 20 can also individually calculate the travel time or phase difference for the laser beam of the first laser module 30 or the second laser module 40, thereby calculating the distance from first laser module 30 to the corresponding end surface or that from the second laser module 40 to the corresponding end surface. After including the length of the housing 10, the invention obtains the actual total distance to one of the objects of interest.

Figure 2:
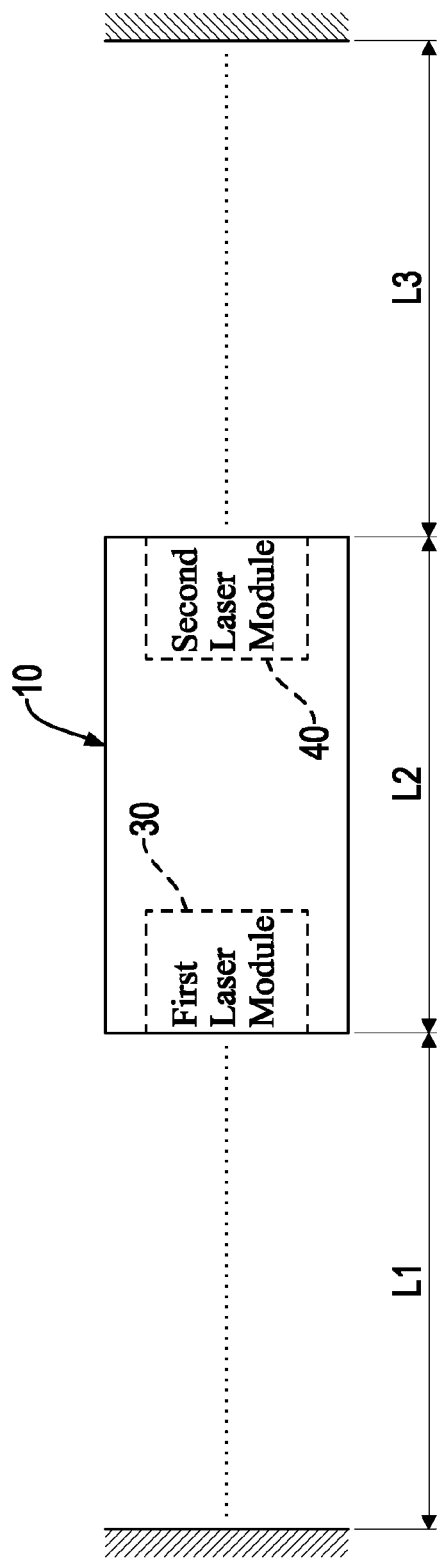
FIG. 2 is a schematic view of the dual-directional laser rangefinder in use.

FIG. 2 shows schematically how the disclosed dual-directional laser rangefinder is used to measure distance. As shown in the drawing, the length of the housing is L2, the distance from the first laser module 30 to one of the end surfaces (e.g., a wall) is L1, and the distance from the second laser module 40 to the other end surface (e.g., another wall) is L3. The control module 20 drives the first laser module 30 and the second laser module 40 to emit laser beams outward and to receive reflected laser beams. The control module 20 then computes respectively the travel times or phase differences for the beams from/to the first laser module 30 and the second laser module 40, thereby calculating respectively the distances L2, L3 from the housing 10 to the two end surfaces. After including the length L1 of the housing 10, the invention directly obtains the total distance, $L=L1+L2+L3$, between the two end surfaces. It does not require the user to put the laser rangefinder against one of the end surfaces, as for the existing laser rangefinders, rendering the invention more convenient to use.

While the invention has been described by way of example and in terms of the preferred embodiment, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A dual-directional laser rangefinder, comprising:
a housing taking the form of a rectangular hollow box and having two opposite ends;
a control module disposed inside the housing;
a first laser module having a first laser emitting end and a first laser receiving end;
a second laser module having a second laser emitting end and a second laser receiving end electrically connected to the control module, wherein the first laser module and the second laser module are respectively installed on the two opposite ends along a longitudinal direction;
a display module disposed on the housing and electrically connecting to the control module; and
a key module disposed on the housing and having a plurality of keys, each of which electrically connects to the control module;
wherein the two laser modules emit laser beams outward in opposite directions of the housing and receive reflected laser beams from two end surfaces whose distance in between is to be determined; the control module computes respectively travel times or phase differences for the laser beams of the two laser modules, thereby calculating respectively two distances from the two laser modules to the two corresponding end surfaces and then obtaining an actual total distance between the two end surfaces.

2. The dual-directional laser rangefinder of claim 1, wherein the control module computes respectively the travel times or the phase differences for the laser beams from/to the first laser module and the second laser module, thereby calculates respectively the two distances from the housing to the two end surfaces, and obtains the actual total distance between the two end surfaces after including a length of the housing.

3. The dual-directional laser rangefinder of claim 2, wherein the display module and the key module are provided on a side of the housing along a vertical direction.

4. The dual-directional laser rangefinder of claim 3, wherein the key module includes a power key (POWER or ON/OFF), a measure key, and a unit selection key, each of which electrically connects to the control module.

5. The dual-directional laser rangefinder of claim 1, wherein the control module further electrically connects to a power module that provides power required by the control module, the two laser modules, the display module and the key module.

6. The dual-directional laser rangefinder of claim 2, wherein the control module further electrically connects to a power module that provides power required by the control module, the two laser modules, the display module and the key module.

7. The dual-directional laser rangefinder of claim 3, wherein the control module further electrically connects to a power module that provides power required by the control module, the two laser modules, the display module and the key module.

8. The dual-directional laser rangefinder of claim 4, wherein the control module further electrically connects to a power module that provides power required by the control module, the two laser modules, the display module and the key module.

9. The dual-directional laser rangefinder of claim 2, wherein the first laser emitting end and the first laser receiving end of the first laser module are integrated together, and the second laser emitting end and the second laser receiving end of the second laser module are integrated together.

10. The dual-directional laser rangefinder of claim 3, wherein the first laser emitting end and the first laser receiving end of the first laser module are integrated together, and the second laser emitting end and the second laser receiving end of the second laser module are integrated together.

11. The dual-directional laser rangefinder of claim 4, wherein the first laser emitting end and the first laser receiving end of the first laser module are integrated together, and the second laser emitting end and the second laser receiving end of the second laser module are integrated together.

12. The dual-directional laser rangefinder of claim 9, wherein the control module further electrically connects to a power module that provides power required by the control module, the two laser modules, the display module and the key module.

* * * * *